UNITED STATES PATENT OFFICE.

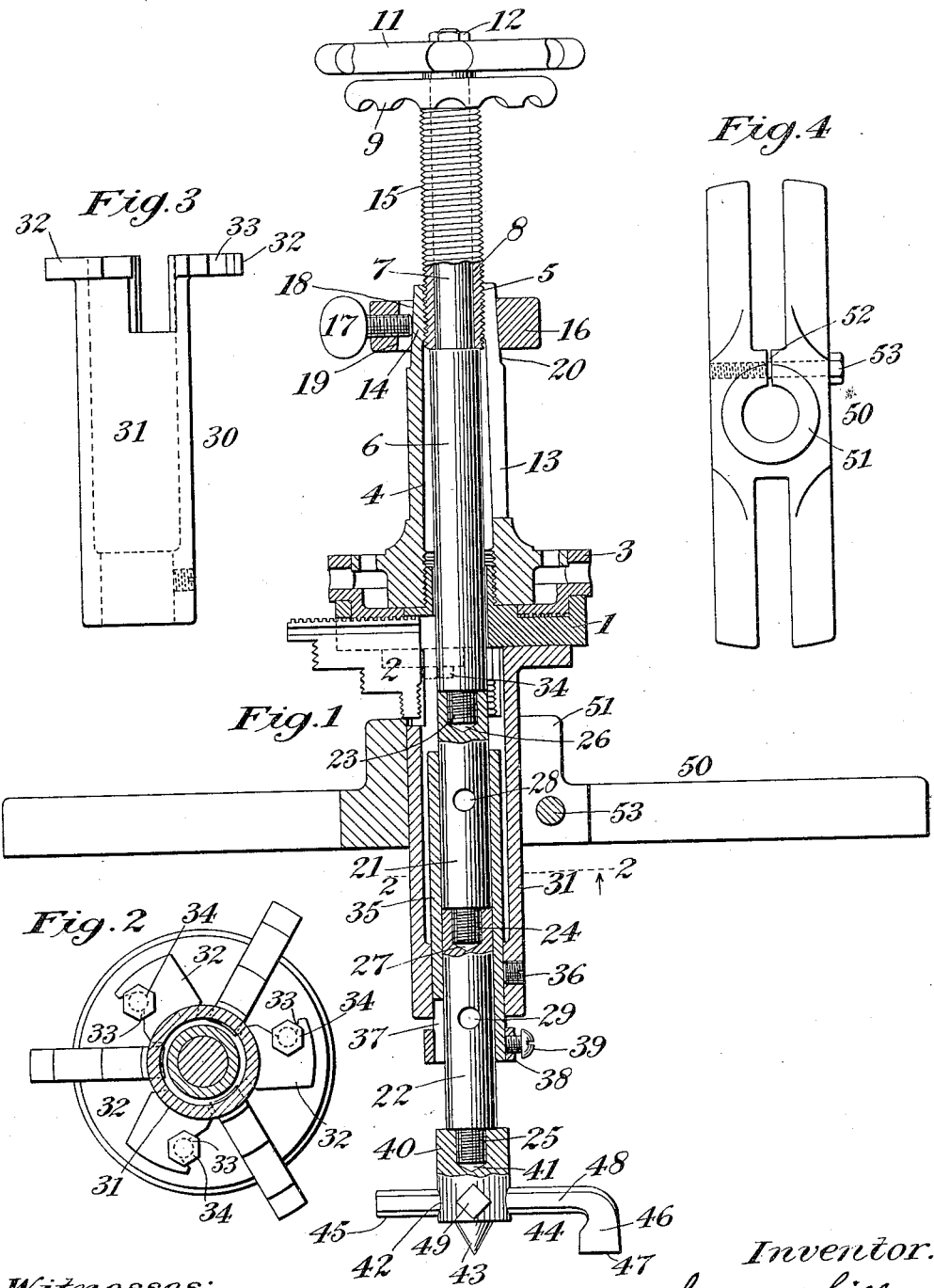

THOMAS B. WILLIAMS, OF ORANGE, MASSACHUSETTS, ASSIGNOR TO LEAVITT MACHINE COMPANY, OF ORANGE, MASSACHUSETTS, A CORPORATION OF MASSACHUSETTS.

MACHINE FOR FACING VALVE-SEATS.

1,036,394.

Specification of Letters Patent.

Patented Aug. 20, 1912.

Application filed November 23, 1906. Serial No. 344,681.

*To all whom it may concern:*

Be it known that I, THOMAS B. WILLIAMS, a citizen of the United States, and a resident of Orange, in the county of Franklin and State of Massachusetts, have invented certain new and useful Improvements in Machines for Facing Valve-Seats, of which the following is a specification.

In the manufacture of valve-casings the valve seats therein are usually raised above the metal of the surrounding portion of the casing, the valve-casing when finished containing a raised annular valve seat surrounding an opening to be controlled by a valve resting on said seat. In order to keep the valve from leaking it is necessary from time to time to dress or reface the valve-seat, this refacing being usually done by means of a special tool which is fastened to the valve-casing. After such a raised valve-seat has been refaced a number of times by cutting away the metal of the original seat, the metal of the valve-seat, which originally projected from the surrounding metal of the casing, is entirely removed by the cutting tool used for refacing the seat, and the device becomes unfit for further use.

In an application filed by me November 20th, 1905, Serial No. 288,237, I have shown, described and claimed one type of machine for forming a new raised valve-seat in a valve-casing after the original seat has disappeared as the result of wear and repeated refacing of the original seat. In said application the means employed for accomplishing this result are illustrated as embodied in a well-known type of machine for refacing valve-seats, the principal modification of such a machine consisting in the attachment thereto of means for cutting an annular groove in the valve-casing around the original valve-seat. In order that this groove may be properly formed it is necessary to make use of a tool that will operate upon the metal surrounding the valve-seat and lying between the outside edge of the original valve-seat and the surrounding wall of the casing. In the present case, as in said prior application, a cutting tool is employed for this purpose, and it has a cutting edge the length of which corresponds approximately to the difference between the radius of the valve-seat and the radius of the semicircular wall which usually surrounds such seat. It is important that this cutting tool shall be adjustable transversely to the axis of the rotary spindle by which it is carried, in order that it may be located with precision between the outer edge of the original valve-seat and the wall surrounding the same not only for any given size of valve-seat but for all sizes of seats within the range of operation of the cutting tool.

In my application just referred to the means therein illustrated for raising a new valve-seat in a valve-casing after the disappearance of the original valve-seat are shown as applied to a valve-seat refacing machine the rotary spindle of which is supported in a bearing-sleeve which is movable axially in order to permit the spindle and the cutter carried thereby to have quick adjustment toward or from the work by a sliding movement without rotation of the spindle after the machine has been attached to a valve-casing. The manner in which such a machine is so attached is well understood. In my present invention I retain all the advantages resulting from the construction shown in said prior application, but accomplish the desired results by a mechanism differing radically in construction and operation from that disclosed in said prior application. In the present, as in said former, application, I employ a cutting tool carried by a rotary spindle capable of adjustment quickly by a sliding movement lengthwise of the axis of the spindle to any desired working position and without any rotary movement of the spindle; as by sliding the spindle with its attached cutting tool up to the work, the cutting edge of the tool can be more readily located between the outer edge of the valve-seat and the surrounding wall of the casing, and there is no danger of injuring the valve-seat by an improper cutting, as is the case when such a grooving tool is fed up to its working position by a rotary movement of the spindle. This is a matter of great practical importance, as a machine for refacing valve-seats is valuable chiefly because it is adapted to reface the valve-seats without removing the valve-casings from the parts to which they are connected, and it is particularly important in connection with those types of valve-seats which are deep-seated and therefore difficult to get at, to the raising of which valve-seats my present improvements are especially applicable. In refacing or raising such deep valve-seats it is necessary to make use of a machine having an extended spindle in connection with which spindle it is important to employ an extended bearing in order to provide proper support for the spindle close to the cutting point. This is particularly true in using such machine to reface or raise the deep valve-seats of steam-pumps, the principal use of the improved machine disclosed herein being to raise and renew the deep valve-seats of steam-pumps, which seats have been worn out and reduced to the level of the surrounding metal of the pump-casing by repeated refacings. It is also a matter of great practical importance in raising or restoring a worn-out deep-seated valve-seat to provide a proper support for the spindle at a point as close as possible to the cutting tool. This I prefer to accomplish by the use of a modification of the type extended bearing disclosed in the patent, granted to me March 6th, 1906, No. 814,418. In my present improvement the extended bearing proper is a modified form of the type of tubular member or circular yoke illustrated in said patent. This tubular member is not permanently connected with the chuck, as in my said prior patent, but instead is detachably connected with the chuck, it being secured, as in said patent, directly to the chuck body. My improvements therefore constitute essentially an attachment to a machine for facing valves and valve-seats, and this attachment may, by a mere turn of the ring controlling the positioning of the adjustable jaws of the chuck, be connected to or disconnected from the main part of the machine instantaneously.

In the drawings accompanying this specification and forming part of the present application Figure 1 illustrates in vertical section, partly in elevation, a machine embodying my improvements for raising valve-seats; Fig. 2 is a transverse section of the same, the section being taken in the line 2—2, Fig. 1; Fig. 3 is a detail of the tubular member of the attachment; and Fig. 4 is a detail of a yoke for attaching the machine to the work.

In carrying my invention into effect I prefer to make use of a well-known type of machine for facing valve-seats as the apparatus to which I attach suitable means for forming a groove between the original valve-seat and the surrounding wall of a valve-casing, such a machine, however, being modified to the extent before specified and which will be set forth more in detail hereinafter. The machine proper is shown as so constructed as to be readily attachable to and detachable from valve-casings by means of a chuck having adjustable jaws for fitting openings of different sizes in valve-casings. The main member of such a machine is ordinarily a chuck, such as 1, having adjustable radially-movable jaws, such as 2, which may be moved in and out by means of an adjusting-ring, such as 3, in a manner which is well understood. This chuck constitutes the body of the machine and forms the principal support for the other parts, and particularly for the main spindle and the cutter carried thereby. Here the chuck has the usual tubular member 4 projecting therefrom and internally screw-threaded at its free end at 5. Normally these internal threads are engaged by corresponding threads carried by the spindle to which the cutter is secured. This spindle, which is indicated at 6, passes through the chuck and the tubular member 4 extending therefrom and is inclosed in said tubular member for a considerable portion of its length. At its upper end the spindle is reduced at 7, and on this reduced portion is journaled a relatively long sleeve 8, to the upper end of which is secured a hand-wheel 9, by means of which the sleeve 8 is turned and which normally serves to impart a slow feed movement to the spindle 6 and the cutter secured to the lower end thereof. The sleeve 8 and the hand-wheel 9 are held in a fixed position lengthwise of the spindle between the shoulder formed by the reduced portion thereof and another hand-wheel 11 at the upper end of the spindle, by which the spindle may be turned without imparting feed movement thereto. This hand-wheel 11 is held in place by a suitable stop, such as the nut 12.

All of the parts just described are of well-known construction and coact in a manner which is well understood. The split portion of the tubular member 4 differs in construction, however, from split portions of corresponding tubular members as heretofore used. In this case the longitudinal slits, 13, which form the split portion, extend practically the full length of the tubular member and form a plurality of internally-threaded jaws 14 which are expansible and contractible to increase or decrease the diameter of the split end of said tubular member. By splitting the tubular member for practically its full length and employing the proper metal in the construction of such tubular member, spring arms are formed which are sufficiently resilient to permit the internal threads of the jaws 14 to spring clear of the spindle and its associated parts when free to expand. Any suitable means associated with the spindle may coact with the jaws of the tubular member to be engaged thereby and released therefrom. Preferably the sleeve 8 will have external threads 15, which may extend throughout the length of said sleeve, these threads being of the same diameter and pitch as the internal threads 5 of the jaws 14, in order that the two sets of threads may coöperate properly.

In the ordinary operation of the machine just described the jaws 14 will be contracted by means which will be hereinafter referred to, and the screw-threads 15 of the sleeve 8 will compel the spindle and the sleeve 8 to travel slowly in the direction of their common longitudinal axis when the hand-wheels are turned, and thus the cutter will ordinarily be fed slowly toward or from the work. When, however, it is desired to shift the spindle and the cutter quickly in the direction of such axis, such a quick adjustment may be effected by expanding the jaws 14 until the internal threads 5 thereof are clear of the external threads 15 on the sleeve 8, when said spindle may be slid quickly through the tubular member 4 in either direction, and with it of course the sleeve and the cutter.

Any suitable means may be employed for controlling the expansion and contraction of the jaws 14 at the free end of the tubular member 4. In this construction I have illustrated a screw-clamp for the purpose, said clamp comprising a ring 16 encircling the split free end of said tubular member, and a clamp-screw 17 passing radially through a threaded opening in said ring and impinging against the periphery of the tubular member. As here shown, the periphery of said tubular member 4 may be flattened at one point, as indicated at 18, in order to prevent rotation of the ring 17, said ring being correspondingly flattened on its inner side at 19. The free end of the split portion of said tubular member with which said ring coacts may be tapered, as indicated at 20, and the inner side of the ring may be correspondingly tapered. It will be seen that when the jaws 14 are in their expanded positions and the clamp-screw 17 is turned to contract such jaws and reduce the diameter of the internal threads 5, all of the jaws 14 are simultaneously caused to approach their common axis. By loosening the clamp-screw 17 and permitting the jaws 14 to expand, which will usually be done after the machine has been attached to a valve-casing, the spindle may be shifted quickly to bring the cutter into contact with the valve-seat to be refaced (not shown), and after it is in contact with said seat the clamp-screw may be tightened again to bring the screw-threads 5 and 15 into operative relation again, whereupon the cutter may be slowly fed into the work in the usual manner to true up the valve-seat.

The spindle 6, as here shown, is not the ordinary spindle used in a machine of this kind, but is a long spindle having preferably one or more extensions of the main part of the spindle. I have here illustrated two such sections connected together and to the main part of the spindle, these sections being designated respectively 21 and 22, and each of them having, as has the main portion of the spindle, a reduced screw-threaded lower end. The reduced threaded ends of the spindle proper and of its extensions are designated herein by 23, 24 and 25 respectively, and the threaded ends of the spindle proper and its first extension are connected respectively to the first and second extensions of the spindle by being screwed into complementary threaded openings 26 and 27 in such parts. The two sections 21 and 22 are preferably identical in construction, so as to be interchangeable, and each has in this case a transverse opening extending therethrough for the reception of a rod for turning the parts to separate them. These openings are designated by 28 and 29 respectively. The object of forming the rotary spindle for the cutter in this manner instead of in one piece is to permit the machine to be used ordinarily in the regular manner, that is, without the extensions 21 and 22, which will only be connected to the main member of the spindle when the machine is used for the purpose set forth herein, that is, to form a new valve-seat of the deep-seated type after such seat has disappeared as the result of wear and frequent refacing.

The extended spindle just described requires for its proper support an extended bearing. Such an extended bearing may of course be formed in various ways, as for example, in the manner set forth in my prior patent before referred to, but I prefer to provide, as before indicated, an extended bearing which, with all the parts carried thereby, is removable as a whole and practically instantaneously from the main portion of the machine. These parts, viz., the extended bearing and the extension of the spindle, together with certain other details which will be hereinafter described, and the cutter carried by the extended spindle, constitute therefore an attachment to a machine of the ordinary type for refacing valves and valve-seats. The principal elements of this attachment are the extended portion of the spindle, the extended bearing, and the means carried by the extended spindle for cutting an annular groove in a partition of a valve-casing for the purpose of raising from such partition a new valve-seat after the original valve-seat has been destroyed. The extended spindle has been previously described. The extended bearing may be of any suitable type and construction, provided it can be practically instantaneously attached to and removed from the main portion of the machine. As here shown, the main element thereof is a tubular member of one diameter constituting a casing. This tubular member is designated generally by 30. It comprises a long sleeve 31 of small diameter and a supporting flanged portion forming a spider of larger diameter having arms 32 separated by cut-outs. Each arm 32 of the spider preferably has a recess 33 in one side thereof, this recess forming an open-sided slot connection adapted to receive the shank of a screw 34 having a head for engaging the adjacent face of an arm 32 of the spider and clamping said arm to the chuck-body. When it is desired to connect the main machine and the attachment, the spindle sections are first screwed together, and then the end-walls of the open-sided portions 33 of the spider-arms 32 are brought into engagement with the shanks of the screws 34, fastened in the chuck-body by simply placing the spider-arms in contact with the cheek of the chuck, turning the same slightly in the proper direction, and then tightening the screws by a slight turn of each. A slight turn of each screw in the opposite direction is sufficient to release the spider-arms from the chuck-body, whereupon, by a slight turn of the spider-arms away from the screws 34 the attachment may be disconnected from the main machine. When connected the arms 32 serve to position the extended bearing in perfect alinement with the main tubular member 4 on the machine proper.

The tubular member 30 of the extended bearing for the spindle preferably has a bushing 35 which may be held in place therein in any suitable manner, as for example by a set-screw 36, this bushing being slidable in the tubular member 30, and therefore adjustable to any desired position for the purpose of increasing the length of the extended bearing, if desired, and providing a very firm support for the cutting tool at a point close to such tool. At its outer end this bushing 35 is split for a considerable distance, as indicated at 37, and the extreme outer end of the bushing is encircled by a ring 38 through which passes a clamping-screw 39, said clamping-screw and ring constituting a screw-clamp by means of which the diameter of the split portion of the bushing may be decreased as desired to permit the journal portion of the bushing to tightly or loosely engage the extended portion of the spindle.

The cutting means proper for cutting an annular groove in a partition in a valve-casing and thereby raising a new valve-seat separated from the metal of the surrounding wall of the casing, is or may be similar to that disclosed in my prior application, Serial No. 288,237, filed November 20th, 1905. The reduced screw-threaded lower end of the spindle, which in this case is the threaded portion 25 of the section 22 of the spindle, is adapted and intended to receive a tool-holder 40 which at its upper end has an internally-threaded opening 41 for the reception of such threaded reduced lower end 25 of the lowermost section of the spindle. Immediately below this threaded opening 41, which is disposed axially of the tool-holder, that is, in the line of the axis of the spindle, is a transverse tool-opening 42 which passes entirely through the tool-holder and intersects the axis thereof and of the spindle. At its extreme lower end the tool-holder is preferably tapered at 43 to form a center for the machine at its lower end.

The tool by means of which a new valve-seat is to be raised above the other metal of the member containing the original valve-seat may be of the type shown at 44. 45 designates the body portion or stock of the tool, which is here shown as formed from a round rod of tool-steel of suitable quality. The cutting tool proper is formed by bending this rod at substantially a right-angle to the stock and flattening the same, and tempering, beveling, and sharpening to produce the desired cutting edge. The cutter proper is designated by 46 and the cutting edge thereof by 47. Along one side thereof the stock or shank of the tool is flattened, as indicated at 48, in order to enable the tool to be held firmly in place, as by means of a set-screw 49 passing transversely through the tool-holder and impinging against this flattened side 48. The cutting edge 47 just described is, as will be noticed, relatively short, and the cutter proper is relatively narrow, in order that said cutting edge, which projects considerably from the stock or shank of the tool, may cut a groove between the original valve-seat and the surrounding wall of the casing without impairing the face of the valve-seat or any other part.

After the attachment has been connected to the main machine in the manner before described, the tool applied to the spindle, and the machine as a whole connected with the valve-casing or part containing the valve-seat, the spindle is adjusted lengthwise to bring the cutting tool into operative relation with the work. This is accomplished by loosening the clamping-screw 17 and sliding the spindle lengthwise toward the valve-seat until the cutting edge 47 of the tool comes into contact with the surface of the work, when the position of the tool may be noted, and if necessary corrected, before the spindle is turned to permit the tool to cut into the work. The clamping-screw 17 may then be tightened to bring the screw-threads 5 and 15 into engagement again, whereupon the hand-wheels 9 and 11 may be turned in the usual manner to feed the spindle and cutter toward the work simultaneously with the rotation of the same.

This machine being especially adapted and intended for use in cutting such deep-seated valves as pump-valves, the connection of the same with the valve-casing will preferably be effected by means analogous to that heretofore employed, that is, by a yoke, such as 50, which may be secured to the machine and attached to the casing of a steam-pump. This mode of connection is well understood in the art, but the specific type of yoke here shown differs from that ordinarily employed in that the hub 51 thereof has a smooth journal surface and is divided at 52 to form a clamping collar which may be tightened by a screw 53. The journal opening is of the same diameter as the sleeve 31. When in the positions shown in Fig. 1, the yoke and the sleeve 31 may be clamped tightly together by the screw 53.

What I claim is:

1. A machine for facing deep valve-seats, it comprising a valve-facing machine embodying clamping means for engaging a valve-casing, and a rotary spindle carried by said clamping means and extending to a point adjacent to the end of the clamping means; in combination with an attachment to said valve-facing machine, said attachment comprising an extended bearing, an extended spindle journaled in said bearing, means embodying open-sided slot connections for quickly connecting and disconnecting the clamping means and the extended bearing, and means for also connecting and disconnecting the two parts of the spindle.

2. A machine for facing deep valve-seats, it comprising a valve-facing machine embodying clamping means for engaging a valve-casing, and a rotary spindle carried by said clamping means and extending to a point adjacent to the end of the clamping means; in combination with an attachment to said valve-facing machine, said attachment comprising an extended bearing, an extended spindle journaled in said bearing, and means, embodying interlocking parts on said clamping means and on the extended bearing, for quickly connecting and disconnecting said clamping means and the extended bearing.

Signed at Orange, in the county of Franklin, and State of Massachusetts, this nineteenth day of November A. D. 1906.

THOMAS B. WILLIAMS.

Witnesses:
 FRED A. DEXTER,
 MAUDE B. WHITNEY.

---

Copies of this patent may be obtained for five cents each, by addressing the "Commissioner of Patents, Washington, D. C."